United States Patent
Hirose et al.

(10) Patent No.: US 10,913,686 B2
(45) Date of Patent: Feb. 9, 2021

(54) COMPOSITE CERAMIC POWDER, SEALING MATERIAL, AND COMPOSITE CERAMIC POWDER PRODUCTION METHOD

(71) Applicant: Nippon Electric Glass Co., Ltd., Shiga (JP)

(72) Inventors: Masayuki Hirose, Shiga (JP); Yoshikatsu Nishikawa, Shiga (JP); Takuji Oka, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/314,990

(22) PCT Filed: Jun. 19, 2017

(86) PCT No.: PCT/JP2017/022561
§ 371 (c)(1),
(2) Date: Jan. 3, 2019

(87) PCT Pub. No.: WO2018/008379
PCT Pub. Date: Jan. 11, 2018

(65) Prior Publication Data
US 2019/0225547 A1    Jul. 25, 2019

(30) Foreign Application Priority Data

Jul. 6, 2016 (JP) .................................. 2016-134069

(51) Int. Cl.
*C04B 35/19* (2006.01)
*C03C 8/24* (2006.01)
(Continued)

(52) U.S. Cl.
CPC ................ *C04B 35/19* (2013.01); *C03C 8/24* (2013.01); *C04B 35/117* (2013.01);
(Continued)

(58) Field of Classification Search
CPC . C04B 35/19; C04B 35/62695; C04B 35/117; C04B 2235/3232;
(Continued)

(56) References Cited

U.S. PATENT DOCUMENTS

| | | | |
|---|---|---|---|
| 7,696,116 B2* | 4/2010 | Reimanis | C04B 35/117 501/128 |
| 2007/0225153 A1* | 9/2007 | Reimanis | C04B 35/488 501/128 |
| 2012/0107585 A1* | 5/2012 | Blanchard | C04B 35/6263 428/212 |

FOREIGN PATENT DOCUMENTS

| | | |
|---|---|---|
| JP | 63-315536 | 12/1988 |
| JP | 5-147974 | 6/1993 |

(Continued)

OTHER PUBLICATIONS

International Preliminary Report on Patentability dated Jan. 8, 2019 in International Application No. PCT/JP2017/022561.

*Primary Examiner* — Noah S Wiese
(74) *Attorney, Agent, or Firm* — Wenderoth, Lind & Ponack, L.L.P.

(57) ABSTRACT

A composite ceramic powder of the present invention includes: a LAS-based ceramic powder having precipitated therein β-eucryptite or a β-quartz solid solution as a main crystal; and $TiO_2$ powder and/or $ZrO_2$ powder.

9 Claims, 2 Drawing Sheets

(51) Int. Cl.
*C04B 35/626* (2006.01)
*C04B 35/117* (2006.01)

(52) U.S. Cl.
CPC .. *C04B 35/62665* (2013.01); *C04B 35/62685* (2013.01); *C04B 35/62695* (2013.01); C04B 2235/3203 (2013.01); C04B 2235/3217 (2013.01); C04B 2235/3232 (2013.01); C04B 2235/3244 (2013.01); C04B 2235/3418 (2013.01); C04B 2235/36 (2013.01); C04B 2235/441 (2013.01); C04B 2235/442 (2013.01); C04B 2235/5436 (2013.01); C04B 2235/6562 (2013.01); C04B 2235/6565 (2013.01); C04B 2235/6567 (2013.01); C04B 2235/767 (2013.01); C04B 2235/87 (2013.01)

(58) Field of Classification Search
CPC ... C04B 2235/3244; C03C 8/24; C03C 14/00; C03C 2214/20
See application file for complete search history.

(56) References Cited

FOREIGN PATENT DOCUMENTS

| | | | | |
|---|---|---|---|---|
| JP | 8-59294 | | 3/1996 | |
| JP | 2001106550 A | * | 4/2001 | ............... C03C 8/24 |
| JP | 2006-137635 | | 6/2006 | |
| JP | 2006137635 A | * | 6/2006 | ........... C04B 35/626 |
| JP | 2011-195429 | | 10/2011 | |
| JP | 2011-236120 | | 11/2011 | |

\* cited by examiner

US 10,913,686 B2

COMPOSITE CERAMIC POWDER, SEALING MATERIAL, AND COMPOSITE CERAMIC POWDER PRODUCTION METHOD

TECHNICAL FIELD

The present invention relates to a composite ceramic powder, a sealing material, and a method of producing a composite ceramic powder, and more specifically, to a composite ceramic powder to be used by being mixed with a glass powder, a sealing material, and a method of producing a composite ceramic powder.

BACKGROUND ART

In general, a composite powder material including a glass powder and a ceramic powder is used as a sealing material. This sealing material is excellent in chemical durability and heat resistance and suitable for securing airtightness as compared to a resin-based adhesive.

For example, high-expansion and low-melting-point glass, such as PbO-based glass or $Bi_2O_3$-based glass, is used as the glass powder for sealing (see, for example, Patent Literatures 1 and 2).

In addition, the sealing material is used for sealing of a low-expansion substrate, such as an alumina substrate or a glass substrate. In this case, when the sealing material has an excessively high thermal expansion coefficient, there is a risk in that inappropriate residual strain is caused in a sealing material layer or the low-expansion substrate after the sealing, and cracks occur in the sealing material layer or the low-expansion substrate, resulting in hermetic leakage or the like. Therefore, when an object to be sealed has a low expansion coefficient, it is important to reduce the thermal expansion coefficient of the sealing material. In particular, when $Bi_2O_3$-based glass is used as the glass powder, a reduction in thermal expansion coefficient of the $Bi_2O_3$-based glass is naturally limited, and hence it is important to reduce the thermal expansion coefficient of the ceramic powder.

In view of the foregoing, when negative-expansion ceramic powder is used, the thermal expansion coefficient of the sealing material can be effectively reduced.

A lithium aluminosilicate-based (hereinafter referred to as "LAS-based") ceramic powder has been known as the negative-expansion ceramic powder. Moreover, the negative expansion of the LAS-based ceramic powder is expressed through negative expansion of crystal grains of a β-quartz solid solution or the like to be precipitated therein.

CITATION LIST

Patent Literature 1: JP 63-315536 A
Patent Literature 2: JP 08-59294 A

SUMMARY OF INVENTION

Technical Problem

Incidentally, when a sealing material comprising the $Bi_2O_3$-based glass powder and the LAS-based ceramic powder is fired, there is a risk in that a surface layer of the LAS-based ceramic powder is dissolved out and diffused into $Bi_2O_3$-based glass, and the amount of crystals in the LAS-based ceramic powder in the sealing material is reduced, resulting in an obstacle to reducing the expansion coefficient of the sealing material.

The present invention has been made in view of the above-mentioned circumstances, and a technical object of the present invention is to devise a ceramic powder which exhibits low expansion (particularly, negative expansion) and is less liable to be diffused into glass in a firing step (particularly, a sealing step).

Solution to Problem

As a result of extensive efforts, the inventors of the present invention have found that the above-mentioned technical object can be achieved by adding $TiO_2$ powder and/or $ZrO_2$ powder to a LAS-based ceramic powder, and mixing the powders. Thus, the finding is proposed as the present invention. That is, a composite ceramic powder according to an embodiment of the present invention comprises: a LAS-based ceramic powder having precipitated therein β-eucryptite or a β-quartz solid solution as a main crystal (crystal in the largest precipitation amount); and $TiO_2$ powder and/or $ZrO_2$ powder.

Among LAS-based crystals ($Li_2O$—$Al_2O_3$-$nSiO_2$), the β-eucryptite ($Li_2O$—$Al_2O_3$-$2SiO_2$) and the β-quartz solid solution ($Li_2O$—$Al_2O_3$-$nSiO_2$: n>2), in which $SiO_2$ is additionally solid solved from the β-eucryptite, have negative expansion characteristics. Meanwhile, among the LAS-based crystals ($Li_2O$—$Al_2O_3$-$nSiO_2$), a crystal in which $SiO_2$ is solid solved until n exceeds around 4 transforms into a β-spodumene solid solution, which has a positive thermal expansion coefficient. In view of the foregoing, in the LAS-based ceramic powder according to the embodiment of the present invention, the β-eucryptite or the β-quartz solid solution is precipitated as a main crystal.

In the composite ceramic powder according to the embodiment of the present invention, the $TiO_2$ powder and/or the $ZrO_2$ powder is added to and mixed with the LAS-based ceramic powder. With this, a thermal expansion reducing effect can be maintained. The reason why the thermal expansion reducing effect can be maintained is not experimentally clarified, but the inventors of the present invention presume as described below. When the $TiO_2$ powder and/or the $ZrO_2$ powder is added to and mixed with the LAS-based ceramic powder, a surface layer of the LAS-based ceramic powder is less liable to be diffused into glass, and hence the amount of crystals in the LAS-based ceramic powder is not reduced, with the result that the thermal expansion reducing effect can be maintained.

In addition, in the composite ceramic powder according to the embodiment of the present invention, it is preferred that the LAS-based ceramic powder comprise as a composition, in terms of mol %, 10% to 35% of $Li_2O$, 10% to 35% of $Al_2O_3$, and 30% to 80% of $SiO_2$. With this, the positive-expansion β-spodumene solid solution is less liable to be precipitated, and hence the negative expansion characteristics are easily maintained.

In addition, in the composite ceramic powder according to the embodiment of the present invention, it is preferred that a total content of the $TiO_2$ powder and the $ZrO_2$ powder be from 0.05 mass % to 10 mass %.

In addition, it is preferred that the composite ceramic powder according to the embodiment of the present invention be substantially free of a glass phase. With this, a specific component (particularly, $Li_2O$) of the LAS-based ceramic powder is less liable to be dissolved in glass in a firing step (particularly, a sealing step), and hence the glass is less liable to be devitrified. In addition, the thermal expansion coefficient of a sealing material is easily maintained. Herein, the presence or absence of the glass phase may be determined with an X-ray diffractometer. For example, when the LAS-based ceramic powder has a crystallinity of 95% or more, it may be judged that the LAS-based ceramic powder is substantially free of the glass phase. The "crystallinity" refers to a value determined as described below. X-ray diffraction is measured by a powder method, and a halo area corresponding to a mass of an amorphous component and a peak area corresponding to a mass of a crystalline component are calculated, and then the crystallinity is determined by the expression: [peak area]×100/[peak area+halo area] (%).

When the LAS-based ceramic powder is produced through a solid phase reaction, the LAS-based ceramic powder substantially free of the glass phase can be obtained. Meanwhile, when the LAS-based ceramic powder is produced by a melting method, the glass phase remains in the LAS-based ceramic powder. The melting method is a method involving melting a raw material batch once to obtain a glass melt, followed by cooling and pulverizing the resultant glass melt, and subjecting the resultant to heat treatment as required, to thereby produce a LAS-based ceramic powder.

A sealing material according to an embodiment of the present invention comprises a glass powder and a ceramic powder, wherein the ceramic powder comprises: a LAS-based ceramic powder having precipitated therein β-eucryptite or a β-quartz solid solution as a main crystal; and $TiO_2$ powder and/or $ZrO_2$ powder. Herein, in the sealing material according to the embodiment of the present invention, the mixing of the LAS-based ceramic powder and the $TiO_2$ powder and/or the $ZrO_2$ powder does not need to be performed before the mixing of the LAS-based ceramic powder and the glass powder, and may be performed simultaneously with the mixing of the LAS-based ceramic powder and the glass powder.

A method of producing a composite ceramic powder according to an embodiment of the present invention comprises the steps of: firing a raw material batch to obtain, through a solid phase reaction, a sintered body having precipitated therein β-eucryptite or a β-quartz solid solution as a main crystal; pulverizing the sintered body to obtain a LAS-based ceramic powder; and mixing the obtained LAS-based ceramic powder and $TiO_2$ powder and/or $ZrO_2$ powder to obtain a composite ceramic powder.

The method of producing a composite ceramic powder according to the embodiment of the present invention comprises the step of firing a raw material batch to obtain, through a solid phase reaction, a sintered body. When the sintered body is produced through the solid phase reaction, the glass phase does not remain in the sintered body. As a result, a specific component (particularly, $Li_2O$) of the LAS-based ceramic powder is less liable to be dissolved in glass at the time of sealing, and hence the sealing material is less liable to be devitrified. In addition, the thermal expansion coefficient of the sealing material is easily reduced.

In addition, it is preferred that the method of producing a composite ceramic powder according to the embodiment of the present invention comprise using a pulverized product of a pre-sintered body containing Li, Al, and Si as a whole or part of introduction raw materials for Li, Al, and Si of the LAS-based ceramic powder. With this, a precipitated crystal can be homogenized, and variations in characteristics of the LAS-based ceramic powder can be reduced.

In addition, it is preferred that the method of producing a composite ceramic powder according to the embodiment of the present invention comprise using any one of an oxide raw material, a hydroxide raw material, and a carbonate raw material as a whole or part of introduction raw materials for Li, Al, and Si of the LAS-based ceramic powder.

In addition, it is preferred that the method of producing a composite ceramic powder according to the embodiment of the present invention comprise blending the raw material batch so that the LAS-based ceramic powder to be obtained comprises as a composition, in terms of mol %, 10% to 35% of $Li_2O$, 10% to 35% of $Al_2O_3$, and 30% to 80% of $SiO_2$.

In addition, in the method of producing a composite ceramic powder according to the embodiment of the present invention, it is preferred that the firing a raw material batch be performed at from 1,000° C. to 1,450° C. to obtain, through the solid phase reaction, the sintered body having precipitated therein β-eucryptite or a β-quartz solid solution as a main crystal. With this, the LAS-based crystal can be appropriately precipitated without the glass phase remaining in the sintered body.

In addition, in the method of producing a composite ceramic powder according to the embodiment of the present invention, it is preferred that the pulverizing the sintered body be performed so that the LAS-based ceramic powder is substantially free of microcracks. With this, the particle diameter of the LAS-based ceramic powder is reduced, and hence the composite ceramic powder can be suitably applied to a hermetic package including a sealing material layer having a small thickness. When the LAS-based ceramic powder has an average particle diameter $D_{50}$ of less than 10 μm, a state in which the LAS-based ceramic powder is substantially free of microcracks is achieved.

DESCRIPTION OF EMBODIMENTS

Figure 1:
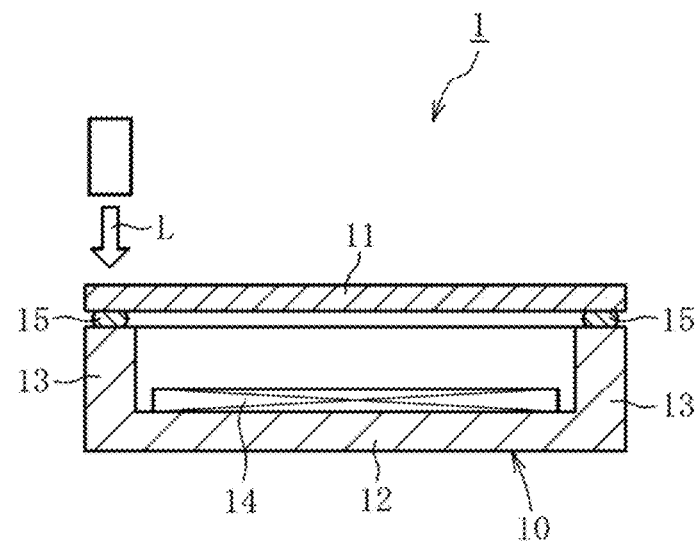
FIG. 1 is a schematic sectional view for illustrating an embodiment of a hermetic package according to the present invention.

In a LAS-based ceramic powder according to the present invention, it is preferred that β-eucryptite or a β-quartz solid solution be precipitated as a main crystal and no other crystal be precipitated, but as long as the effects of the present invention are not significantly impaired, the other crystal may be precipitated in a small amount.

It is preferred that the LAS-based ceramic powder according to the present invention comprise, as a composition, in terms of mol %, 10% to 35% (preferably 16% to 30%) of $Li_2O$, 10% to 35% (preferably 16% to 30%) of $Al_2O_3$, and 30% to 80% (preferably 40% to 70%) of $SiO_2$. When the composition of the ceramic powder deviates from the above-mentioned range, the precipitation of the β-eucryptite or the β-quartz solid solution as a main crystal becomes difficult. In addition, the ceramic powder is difficult to maintain the low expansion characteristics when reduced in particle diameter.

Any component, other than the above-mentioned components, such as a sintering aid, may be introduced within a range of 10% or less.

In a composite ceramic powder of the present invention, the content of $TiO_2$ powder and $ZrO_2$ powder in terms of a total content is preferably from 0.05 mass % to 10 mass %, particularly preferably from 0.1 mass % to 4 mass %. The individual contents of the $TiO_2$ powder and the $ZrO_2$ powder are each preferably from 0.05 mass % to 10 mass %, particularly preferably from 0.1 mass % to 4 mass %. When the content of the $TiO_2$ powder and the $ZrO_2$ powder is too small, a surface layer of the LAS-based ceramic powder is liable to be dissolved out and diffused into glass in a sealing step. As a result, the amount of crystals in the LAS-based ceramic powder in a sealing material is reduced, and the thermal expansion coefficient of the sealing material is liable to be increased. Meanwhile, when the content of the $TiO_2$ powder and the $ZrO_2$ powder is too large, the thermal expansion coefficients of the $TiO_2$ powder and the $ZrO_2$ powder of their own are reflected in the thermal expansion coefficient of the sealing material, and the thermal expansion coefficient of the sealing material is liable to be increased.

The composite ceramic powder has an average particle diameter $D_{50}$ of preferably 20 μm or less, 10 μm or less, 7 μm or less, or 5 μm or less, particularly preferably from 1 μm to 3 μm. In addition, the composite ceramic powder has a maximum particle diameter $D_{max}$ of preferably 50 μm or less, 30 μm or less, 20 μm or less, or 15 μm or less, particularly preferably from 2 μm to 10 μm. In general, as the ceramic powder has a smaller particle diameter and a larger specific surface area, the surface layer of the ceramic powder is more liable to be dissolved in the glass in the sealing step. Therefore, as the composite ceramic powder has a smaller particle diameter and a larger specific surface area, the effects of the present invention are relatively increased. Herein, the "average particle diameter $D_{50}$" refers to a value measured by laser diffractometry, and represents, in a cumulative particle size distribution curve on a volume basis measured by the laser diffractometry, a particle diameter at which the integration amount of particles from a smaller particle side is 50% in a cumulative manner. The "maximum particle diameter $D_{max}$" refers to a value measured by the laser diffractometry, and represents, in the cumulative particle size distribution curve on a volume basis measured by the laser diffractometry, a particle diameter at which the integration amount of the particles from the smaller particle side is 99% in a cumulative manner.

The composite ceramic powder of the present invention preferably has a negative thermal expansion coefficient (less than $0 \times 10^{-7}/°C.$) in a range of from 30° C. to 300° C. The thermal expansion coefficient is preferably $-1 \times 10^{-7}/°C.$ or less, $-3 \times 10^{-7}/°C.$ or less, or $-6 \times 10^{-7}/°C.$ or less, particularly preferably $-20 \times 10^{-7}/°C.$ or more and $-9 \times 10^{-7}/°C.$ or less. When the thermal expansion coefficient in a range of from 30° C. to 300° C. is too high, it becomes difficult to sufficiently reduce the thermal expansion coefficient of a sealing material. The "thermal expansion coefficient in a range of from 30° C. to 300° C." may be measured through push-rod type thermal expansion coefficient measurement (TMA). It is difficult to directly measure the thermal expansion coefficient of the composite ceramic powder, but when the thermal expansion coefficient of a fired body obtained by mixing a glass powder and the composite ceramic powder are at a predetermined volume ratio, and firing the resultant is measured, the thermal expansion coefficient of the composite ceramic powder alone can be determined by calculation.

A sealing material of the present invention is a sealing material, comprising a glass powder and a ceramic powder, wherein the ceramic powder comprises: a LAS-based ceramic powder having precipitated therein β-eucryptite or a β-quartz solid solution as a main crystal; and $TiO_2$ powder and/or $ZrO_2$ powder. The technical features of the sealing material of the present invention partially overlap the technical features of the composite ceramic powder of the present invention, and the detailed description of the overlapping portions is omitted.

In the sealing material of the present invention, the content of the composite ceramic powder is preferably from 1 vol % to 45 vol %, from 10 vol % to 45 vol %, or from 15 vol % to 40 vol %, particularly preferably from 20 vol % to 35 vol %. When the content of the composite ceramic powder is too large, the content of the glass powder is relatively reduced, and it becomes difficult to ensure desired flowability and thermal stability. When the content of the composite ceramic powder is too small, a composite ceramic powder addition effect is reduced.

Any ceramic powder other than the LAS-based ceramic powder, the $TiO_2$ powder, and the $ZrO_2$ powder may be added to the sealing material of the present invention. For example, one kind or two or more kinds selected from cordierite, zircon, alumina, mullite, willemite, zirconium phosphate, zirconium phosphate tungstate, and zirconium tungstate may be included. The content thereof in terms of a total content is preferably from 0 vol % to 15 vol %, particularly preferably from 0 vol % to less than 10 vol %.

In the sealing material of the present invention, any of various glass powders may be used as the glass powder. For example, $Bi_2O_3$-based glass, $V_2O_5$-based glass, or SnO-based glass is suitable in view of a low melting point characteristic, and $Bi_2O_3$-based glass is particularly preferred in view of thermal stability and water resistance. Herein, the "-based glass" refers to glass which comprises the specified components as essential components and in which the content of the specified components is 25 mol % or more, preferably 30 mol % or more, more preferably 35 mol % or more. The glass composition of the glass powder is preferably substantially free of PbO (less than 0.1 mol %) from an environmental point of view.

The $Bi_2O_3$-based glass preferably comprises as a glass composition, in terms of mol %, 28% to 60% of $Bi_2O_3$, 3% to 37% of $B_2O_3$, and 1% to 30% of ZnO. The reasons why the content range of each component is limited as described above are described below. In the description of the glass composition range, the expression "%" means "mol %".

$Bi_2O_3$ is a main component for reducing a softening point, and the content of $Bi_2O_3$ is preferably from 28% to 60% or from 33% to 55%, particularly preferably from 35% to 45%. When the content of $Bi_2O_3$ is too small, the softening point becomes too high and hence flowability is liable to be reduced. Meanwhile, when the content of $Bi_2O_3$ is too large, the glass is liable to devitrify at the time of firing, and owing to the devitrification, the flowability is liable to be reduced.

$B_2O_3$ is an essential component as a glass-forming component, and the content of $B_2O_3$ is preferably from 1% to 37%, particularly preferably from 3% to 30%. When the content of $B_2O_3$ is too small, a glass network is hardly formed, and hence the glass is liable to devitrify at the time of firing. Meanwhile, when the content of $B_2O_3$ is too large, the glass has an increased viscosity, and hence the flowability is liable to be reduced.

ZnO is component which enhances devitrification resistance, and the content of ZnO is preferably from 1% to 30%, from 3% to 25%, or from 5% to 22%, particularly preferably from 9% to 20%. When the content of ZnO deviates from the above-mentioned range, the glass composition loses its component balance, and the devitrification resistance is liable to be reduced.

In addition to the above-mentioned components, for example, the following components may be added.

$SiO_2$ is a component which enhances water resistance, while having an action of increasing the softening point. Accordingly, the content of $SiO_2$ is preferably from 0% to 5%, from 0% to 3%, or from 0% to 2%, particularly preferably from 0% to 1%. In addition, when the content of $SiO_2$ is too large, the glass is liable to devitrify at the time of firing.

$Al_2O_3$ is a component which enhances the water resistance, and the content of $Al_2O_3$ is preferably from 0% to 10% or from 0% to 5%, particularly preferably from 0.1% to 2%. When the content of $Al_2O_3$ is too large, there is a risk in that the softening point is inappropriately increased.

$Li_2O$, $Na_2O$, and $K_2O$ are each a component which reduces the devitrification resistance. Therefore, the individual content of each of $Li_2O$, $Na_2O$, and $K_2O$ is preferably from 0% to 5% or from 0% to 3%, particularly preferably from 0% to less than 1%.

MgO, CaO, SrO, and BaO are each a component which enhances the devitrification resistance, but are each a component which increases the softening point. Therefore, the content of each of MgO, CaO, SrO, and BaO is from 0% to 20% or from 0% to 10%, particularly preferably from 0% to 5%.

In order to reduce the softening point of $Bi_2O_3$-based glass, it is required to introduce a large amount of $Bi_2O_3$ into the glass composition, but when the content of $Bi_2O_3$ is increased, the glass is liable to devitrify at the time of firing, and owing to the devitrification, the flowability is liable to be reduced. This tendency is particularly remarkable when the content of $Bi_2O_3$ is 30% or more. As a countermeasure for this problem, the addition of CuO can effectively suppress the devitrification of the glass even when the content of $Bi_2O_3$ is 30% or more. Further, when CuO is added, laser absorption characteristics at the time of laser sealing can be enhanced. The content of CuO is preferably from 0% to 40%, from 5% to 35%, or from 10% to 30%, particularly preferably from 15% to 25%. When the content of CuO is too large, the glass composition loses its component balance, and hence the devitrification resistance is liable to be reduced contrarily.

$Fe_2O_3$ is a component which enhances the devitrification resistance and the laser absorption characteristics, and the content of $Fe_2O_3$ is preferably from 0% to 10% or from 0.1% to 5%, particularly preferably from 0.5% to 3%. When the content of $Fe_2O_3$ is too large, the glass composition loses its component balance, and hence the devitrification resistance is liable to be reduced contrarily.

$Sb_2O_3$ is a component which enhances the devitrification resistance, and the content of $Sb_2O_3$ is preferably from 0% to 5%, particularly preferably from 0% to 2%. When the content of $Sb_2O_3$ is too large, the glass composition loses its component balance, and hence the devitrification resistance is liable to be reduced contrarily.

The glass powder preferably has an average particle diameter $D_{50}$ of less than 15 μm or from 0.5 μm to 10 μm, particularly preferably from 1 μm to 5 μm. As the average particle diameter $D_{50}$ of the glass powder becomes smaller, the softening point of the glass powder is reduced more.

Any powder material other than the glass powder and the ceramic powder may be introduced in the sealing material of the present invention. For example, in order to enhance the laser absorption characteristics, a laser absorbent, such as a Mn—Fe—Al-based oxide, carbon, or a Mn—Fe—Cr-based oxide, may be included at from 1 vol % to 15 vol %. In addition, glass beads, a spacer, or the like may be introduced.

The sealing material of the present invention is preferably used for laser sealing (sealing through laser light irradiation). In the case of laser sealing, when a sealing material layer has a small thickness, a laser sealing property can be remarkably enhanced. In addition, when the sealing material layer has a small thickness, such sealing material layer can contribute to reductions in height and size of a hermetic package. In order to reduce the thickness of the sealing material layer, the particle diameter of the ceramic powder in the sealing material needs to be reduced. However, in general, when the particle diameter of the ceramic powder is reduced, specifically reduced to 2.0 μm or less, particularly less than 10 μm, the number of microcracks in a crystal grain boundary is reduced, and the thermal expansion coefficient of the sealing material is increased. As a result, it becomes difficult to appropriately reduce the thermal expansion coefficient of the sealing material. Meanwhile, the sealing material of the present invention can maintain low expansion characteristics even when the composite ceramic powder has a small particle diameter. Therefore, the sealing material of the present invention is suitable for laser sealing.

The sealing material of the present invention may be used in a powdery state, but is preferably formed into a paste by being uniformly kneaded with a vehicle from the viewpoint of improving handleabllity. The vehicle generally comprises a solvent and a resin. The resin is added for the purpose of adjusting the viscosity of the paste. In addition, a surfactant, a thickener, or the like may also be added thereto as required. The produced paste is applied onto a surface of an object to be sealed by means of a coating machine, such as a dispenser or a screen printing machine.

As the resin, there may be used an acrylic acid ester (acrylic resin), ethylcellulose, a polyethylene glycol derivative, nitrocellulose, polymethylstyrene, polyethylene carbonate, a methacrylic acid ester, and the like. In particular, an acrylic acid ester and nitrocellulose are preferred because of good thermolytic property.

As the solvent, there may be used N,N'-dimethylformamide (DMF), α-terpineol, a higher alcohol, γ-butyrolactone (γ-BL), tetralin, butylcarbitol acetate, ethyl acetate, isoamyl acetate, diethylene glycol monoethyl ether, diethylene glycol monoethyl ether acetate, benzyl alcohol, toluene, 3-methoxy-3-methylbutanol, water, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like. In particular, α-terpirseol is preferred because of high viscosity and good solubility of a resin and the like.

The sealing material of the present invention has high flowability at the time of laser sealing and has a low thermal expansion coefficient, and hence can be suitably used for laser sealing of a package base and a glass cover of a hermetic package. A hermetic package according to the present invention is a hermetic package, comprising a package base and a glass cover hermetically sealed with each other through intermediation of a sealing material layer, wherein the sealing material layer is formed of a sintered body of a sealing material, and the sealing material is the sealing material described above. The hermetic package according to the present invention is described in detail below.

The package base preferably comprises a base part and a frame part formed on the base part. With this, an internal device, such as a sensor device, is easily housed within the frame part of the package base. The frame part of the package base is preferably formed in a frame shape along a peripheral end edge region of the package base. With this, an effective area for functioning as a device can be enlarged. In addition, the internal device, such as the sensor device, is easily housed in a space in the package base. Besides, for example, joining of wiring is easily performed.

On a top of the frame part, a surface of a region in which the sealing material layer is to be formed preferably has a surface roughness Ra of less than 1.0 µm. When the surface roughness Ra on the surface is increased, the accuracy of the laser sealing is liable to be reduced. Herein, the "surface roughness Ra" may be measured with, for example, a contact-type or non-contact-type laser film thickness meter or surface roughness meter.

The width of the top of the frame part is preferably from 100 µm to 7,000 µm or from 200 µm to 6,000 µm, particularly preferably from 300 µm to 5,000 µm. When the width of the top of the frame part is too small, it becomes difficult to align the sealing material layer and the top of the frame part. Meanwhile, when the width of the top of the frame part is too large, the effective area for functioning as a device is reduced.

The package base is preferably formed of any one of glass ceramic, aluminum nitride, and aluminum oxide, or a composite material thereof (e.g., a composite material in which aluminum nitride and glass ceramic are integrated with each other). Glass ceramic easily forms a reaction layer with the sealing material layer, and hence high sealing strength can be ensured through the laser sealing. Further, a thermal via can be easily formed, and hence a situation in which the temperature of the hermetic package is excessively increased can be properly prevented. Aluminum nitride and aluminum oxide each have a satisfactory heat dissipating property, and hence a situation in which the temperature of the hermetic package is excessively increased can be properly prevented.

It is preferred that glass ceramic, aluminum nitride, and aluminum oxide each have dispersed therein a black pigment (be each sintered under a state in which a black pigment is dispersed therein). With this, the package base can absorb laser light having transmitted through the sealing material layer. As a result, a portion of the package base to be brought into contact with the sealing material layer is heated during the laser sealing, and hence the formation of the reaction layer can be promoted at an interface between the sealing material layer and the package base.

The package base having dispersed therein the black pigment preferably has a property of absorbing laser light to be radiated, for example, has a total light transmittance of 10% or less (desirably 5% or less) at the wavelength (808 nm) of the laser light to be radiated when having a thickness of 0.5 mm. With this, the temperature of the sealing material layer is easily increased at an interface between the package base and the sealing material layer.

The thickness of the base part of the package base is preferably from 0.1 mm to 2.5 mm, particularly preferably from 0.2 mm to 1.5 mm. With this, thinning of the hermetic package can be achieved.

The height of the frame part of the package base, that is, a height obtained by subtracting the thickness of the base part from the package base is preferably from 100 µm to 2,500 µm, particularly preferably from 200 µm to 1,500 µm. With this, thinning of the hermetic package is easily achieved while the internal device is properly housed therein.

Various glasses may be used for the glass cover. For example, alkali-free glass, alkali borosilicate glass, or soda lime glass may be used. The glass cover may be laminated glass obtained by bonding a plurality of glass sheets.

A functional film may be formed on a surface of the glass cover on an internal device side, or on a surface of the glass cover on an outside. An antireflection film is particularly preferred as the functional film. With this, light reflected on the surface of the glass cover can be reduced.

The thickness of the glass cover is preferably 0.1 mm or more or from 0.15 mm to 2.0 mm, particularly preferably from 0.2 mm to 1.0 mm. When the thickness of the glass cover is small, the strength of the hermetic package is liable to be reduced. Meanwhile, when the thickness of the glass cover is large, it becomes difficult to achieve thinning of the hermetic package.

The sealing material layer has a function of softening and deforming by absorbing laser light to form a reaction layer in a surface layer of the package base, to thereby hermetically integrate the package base and the glass cover with each other.

A difference in thermal expansion coefficient between the glass cover and the sealing material layer is preferably less than $50 \times 10^{-7}/°$ C. or less than $40 \times 10^{-7}/°$ C., particularly preferably $30 \times 10^{-7}/°$ C. or less. When the difference in thermal expansion coefficient is too large, a stress remaining in the sealed sites is improperly increased, and the hermetic reliability of the hermetic package is liable to be reduced.

The sealing material layer is preferably formed so that its contact position with the frame part is distant from an inner peripheral end edge of the top of the frame part and is distant from an outer peripheral end edge of the top of the frame part. The sealing material layer is more preferably formed at a position distant from the inner peripheral end edge of the top of the frame part by 50 µm or more, 60 µm or more, or from 70 µm to 2,000 µm, particularly from 80 µm to 1,000 µm. When a distance between the inner peripheral end edge of the top of the frame part and the sealing material layer is too short, it becomes difficult to release heat generated through local heating during the laser sealing, and hence the glass cover is liable to be broken in the course of cooling. Meanwhile, when the distance between the inner peripheral end edge of the top of the frame part and the sealing material layer is too long, it becomes difficult to achieve downsizing of the hermetic package. In addition, the sealing material layer is more preferably formed at a position distant from the outer peripheral end edge of the top of the frame part by 50 µm or more, 60 µm or more, or from 70 µm to 2,000 µm, particularly from 80 µm to 1,000 µm. When a distance between the outer peripheral end edge of the top of the frame part and the sealing material layer is too short, it becomes difficult to release heat generated through local heating during the laser sealing, and hence the glass cover is liable to be broken in the course of cooling. Meanwhile, when the distance between the outer peripheral end edge of the top of the frame part and the sealing material layer is too long, it becomes difficult to achieve downsizing of the hermetic package.

The sealing material layer is preferably formed so that its contact position with the glass cover is distant from an end edge of the glass cover by 50 µm or more, 60 µm or more, or from 70 µm to 1,500 µm, particularly from 80 µm to 800 µm. When a distance between the end edge of the glass cover and the sealing material layer is too short, a difference in surface temperature between the surface of the glass cover on the internal device side and the surface of the glass cover on the outside is increased in an end edge region of the glass cover at the time of laser sealing, and the glass cover is liable to be broken.

The sealing material layer is preferably formed on a center line of the top of the frame part in a width direction, that is, in a middle region of the top of the frame part. With this, heat generated through local heating during the laser sealing is easily released, and hence the glass cover is less liable to be broken. When the top of the frame part has a sufficiently large width, the sealing material layer does not need to be formed on the center line of the top of the frame part in the width direction.

The average thickness of the sealing material layer is preferably less than 8.0 μm, particularly preferably 1.0 μm or more and less than 7.0 μm. As the average thickness of the sealing material layer is reduced more, an α-ray emission rate in the hermetic package is reduced more, and hence a soft error of the internal device is prevented more easily. As the average thickness of the sealing material layer is reduced more, the accuracy of the laser sealing is improved more. Further, when the thermal expansion coefficients of the sealing material layer and the glass cover do not match each other, a stress remaining in the sealed sites after the laser sealing can also be reduced. As a method of controlling the average thickness of the sealing material layer as described above, the following methods are given: a method involving thinly applying a sealing material paste; and a method involving subjecting the surface of the sealing material layer to polishing treatment.

The maximum width of the sealing material layer is preferably 1 μm or more and 2,000 μm or less, particularly preferably 100 μm or more and 1,500 μm or less. When the maximum width of the sealing material layer is small, the sealing material layer is easily distant from the end edges of the frame part, and hence a stress remaining in the sealed sites after the laser sealing is easily reduced. Further, the width of the frame part of the package base can be reduced, and thus the effective area for functioning as a device can be enlarged. Meanwhile, in the case where the maximum width of the sealing material layer is too small, bulk fracture is liable to occur in the sealing material layer when a large shear stress is applied to the sealing material layer. Further, the accuracy of the laser sealing is liable to be reduced.

Now, the present invention is described with reference to the drawing. FIG. 1 is a schematic sectional view for illustrating an embodiment of a hermetic package according to the present invention. As illustrated in FIG. 1, a hermetic package 1 comprises a package base 10 and a glass cover 11. In addition, the package base 10 comprises a base part 12 and a frame part 13 in a frame shape on a peripheral end edge of the base part 12. Moreover, an internal device 14 is housed in a space surrounded by the frame part 13 of the package base 10. Electrical wiring (not shown) configured to electrically connect the internal device 14 to an outside is formed in the package base 10.

A sealing material layer 15 is formed of a sintered body of a sealing material, and the sealing material comprises a glass powder and the composite ceramic powder of the present invention, and is substantially free of a laser absorber. In addition, between a top of the frame part 13 of the package base 10 and a surface of the glass cover 11 on an internal device 14 side, the sealing material layer 15 is formed over the entire length of the top of the frame part 13. The width of the sealing material layer 15 is smaller than the width of the top of the frame part 13 of the package base 10, and further, the sealing material layer 15 is distant from an end edge of the glass cover 11. Further, the average thickness of the sealing material layer 15 is less than 8.0 μm.

The hermetic package 1 may be produced as described below. First, the glass cover 11 in which the sealing material layer 15 is formed in advance is placed on the package base 10 so that the sealing material layer 15 and the top of the frame part 13 are brought into contact with each other. Subsequently, while the glass cover 11 is pressed with a pressing jig, laser light L output from a laser irradiation apparatus is radiated along the sealing material layer 15 from a glass cover 11 side. With this, the sealing material layer 15 softens and flows to react with a surface layer on the top of the frame part 13 of the package base 10, to thereby hermetically integrate the package base 10 and the glass cover 11 with each other. Thus, a hermetic structure of the hermetic package 1 is formed.

A method of producing a composite ceramic powder of the present invention comprises the steps of: firing a raw material batch to obtain, through a solid phase reaction, a sintered body having precipitated therein β-eucryptite or a β-quartz solid solution as a main crystal; pulverizing the sintered body to obtain a LAS-based ceramic powder; and mixing the obtained LAS-based ceramic powder and $TiO_2$ powder and/or $ZrO_2$ powder to obtain a composite ceramic powder. The technical features of the method of producing a composite ceramic powder of the present invention partially overlap the technical features of the composite ceramic powder and the sealing material of the present invention, and the detailed description of the overlapping portions is omitted.

Various raw materials may be used as introduction raw materials for Li, Al, and Si of the LAS-based ceramic powder. Of those materials, a pulverized product of a pre-sintered body containing Li, Al, and Si is preferably used. When the whole or part of the introduction raw materials are pre-sintered, a precipitated crystal can be homogenized, and variations in characteristics of the LAS-based ceramic powder can be reduced. In addition, other than the pulverized product of a pre-sintered body containing Li, Ai, and Si, an oxide raw material, a hydroxide raw material, a carbonate raw material, or the like may be used. The raw material batch for the LAS-based ceramic powder is desirably obtained through wet pulverization and mixing with, for example, a ball mill. With this, the uniformity of the raw material batch is improved, and hence the solid phase reaction can be promoted.

The firing of the raw material batch of the LAS-based ceramic powder may be performed with an electric furnace, a gas furnace, or the like. A firing temperature of the raw material batch is preferably from 1,000° C. to 1,450° C., particularly preferably from 1,250° C. to 1,400° C. When the firing temperature is too low, the amount of the precipitated crystal in the LAS-based ceramic powder is liable to be reduced. Meanwhile, when the firing temperature is too high, part of the sintered body is vitrified, and a glass phase is liable to remain in the sintered body. In addition, the degree of sintering of the sintered body is increased, and hence it becomes difficult to pulverize the sintered body. A firing time period of the raw material batch is preferably from 15 hours to 40 hours. When the firing time period is too short, the amount of the precipitated crystal in the LAS-based ceramic powder is liable to be reduced. Meanwhile, when the firing time period is too long, the degree of sintering of the sintered body is increased, and hence it becomes difficult to pulverize the sintered body.

The pulverization of the sintered body may be performed with a ball mill, a jaw crusher, a jet mill, a disc mill, a spectro mill, a grinder, a mixer mill, or the like, but from the viewpoints of running cost and pulverization efficiency, dry or wet pulverization with a ball mill is preferred. A pulverized particle size of the sintered body is preferably adjusted to the extent that the sintered body is substantially free of microcracks. With this, the particle diameter of the LAS-based ceramic powder is reduced, and hence the ceramic powder can be suitably applied to a hermetic package including a sealing material layer having a small thickness.

After the pulverization of the sintered body, the particle diameter of the LAS-based ceramic powder is preferably controlled through sieve classification or air classification as required.

The mixing of the LAS-based ceramic powder and the $TiO_2$ powder and/or the $ZrO_2$ powder is preferably performed by a wet method with, for example, a ball mill from the viewpoint of uniformity.

EXAMPLES

Now, the present invention is described in detail based on Examples. The following Examples are merely illustrative. The present invention is by no means limited to the following Examples.

(Production of Pulverized Product of Pre-Sintered Body)

Raw materials shown in Table 1 were loaded into a pot made of alumina having an inner volume of 3.6 L and wet pulverized and mixed with each ether for 12 hours. Thus, a raw material batch was produced. In the pulverization and mixing, 3,000 g of zirconia balls of φ3.0 mm were used as pulverization balls, and 600 ml of an alcohol was used as a dispersion medium.

TABLE 1

| (Mass %) | A | B |
|---|---|---|
| Aluminum hydroxide | 44 | 33 |
| Lithium carbonate | 23 | 17 |
| Silicon oxide | 33 | 50 |

Next, the raw material batch was dried, crushed, and retained at 800° C. for 8 hours and then fired at 1,350° C. for 16 hours in an electric furnace. A temperature increasing rate from room temperature to 800° C. was set to 5° C. /min, a temperature increasing rate from 800° C. to 1,350° C. was set to 1° C./min, and a temperature decreasing rate from 1,350° C. was set to 1° C./min.

Further, the resultant sintered body was dry pulverized and wet pulverized until an average particle diameter $D_{50}$ of 1.0 µm was achieved, and was then classified with a 350-mesh test sieve. Thus, pulverized products A and B of pre-sintered bodies were produced.

(Production of LAS-biased Ceramic Powder)

A raw material batch shown in Table 2 was loaded into a pot made of alumina having an inner volume of 3.6 L and wet pulverized and mixed for 12 hours to produce a raw material batch. In the pulverization and mixing, 3,000 g of zirconia balls of φ0.3 mm were used as pulverization balls, and 600 ml of an alcohol was used as a dispersion medium.

TABLE 2

|  |  |  | No. 1 | No. 2 | No. 3 | No. 4 | No. 5 | No. 6 |
|---|---|---|---|---|---|---|---|---|
| Raw material batch for composite ceramic powder (mass %) | LAS-based ceramic powder | Pre-sintered body A | 98 | 58 | 0 | 0 | 100 | 0 |
|  |  | Pre-sintered body B | 0 | 0 | 8 | 100 | 0 | 0 |
|  |  | Aluminum hydroxide | 0 | 0 | 43 | 0 | 0 | 33 |
|  |  | Lithium carboxide | 0 | 0 | 23 | 0 | 0 | 17 |
|  |  | Silicone oxide | 0 | 0 | 32 | 0 | 0 | 50 |
|  | $TiO_2$ powder/ $ZrO_2$ powder | $TiO_2$ | 2 | 1 | 0 | 0 | 0 | 0 |
|  |  | $ZrO_2$ | 0 | 1 | 2 | 0 | 0 | 0 |
| Total composition of composite ceramic powder (mol %) |  | $Li_2O$ | 27 | 24 | 27 | 17 | 25 | 17 |
|  |  | $Al_2O_3$ | 24 | 25 | 24 | 17 | 25 | 17 |
|  |  | $SiO_2$ | 47 | 49 | 48 | 66 | 50 | 66 |
|  |  | $TiO_2$ | 2 | 1 | 0 | 0 | 0 | 0 |
|  |  | $ZrO_2$ | 0 | 1 | 1 | 0 | 0 | 0 |
| Thermal expansion coefficient α30-300 (×10$^{-7}$/° C.) |  |  | −5 | −4 | −3 | 2 | 0 | 6 |

Next, the raw material batch was dried, crushed, and retained at 800° C. for 8 hours and then fired at 1,350° C. for 16 hours in an electric furnace. A temperature increasing rate from room temperature to 800° C. was set to 5° C./min, a temperature increasing rate from 800° C. to 1,350° C. was set to 1° C./min, and a temperature decreasing rate from 1,350° C. was 1° C./min.

Subsequently, the resultant sintered body was dry pulverized until an average particle diameter $D_{50}$ of 25 µm was achieved.

Figure 2:
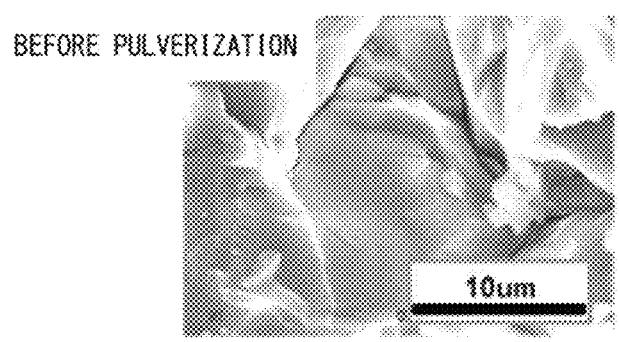
FIG. 2 is an electron micrograph of a LAS-based ceramic powder according to Sample No. 3 (before pulverization) shown in Table 2.
Figure 3:
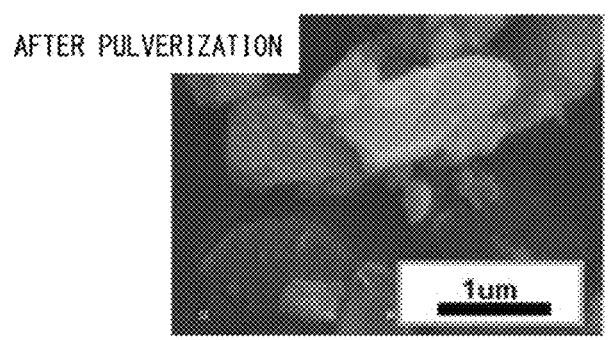
FIG. 3 is an electron micrograph of the LAS-based ceramic powder according to Sample No. 3 (after pulverization) shown in Table 2.
Figure 4:
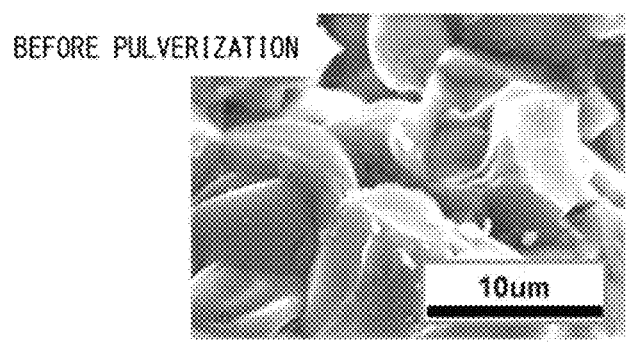
FIG. 4 is an electron micrograph of a LAS-based ceramic powder according to Sample No. 4 (before pulverization) shown in Table 2.
Figure 5:
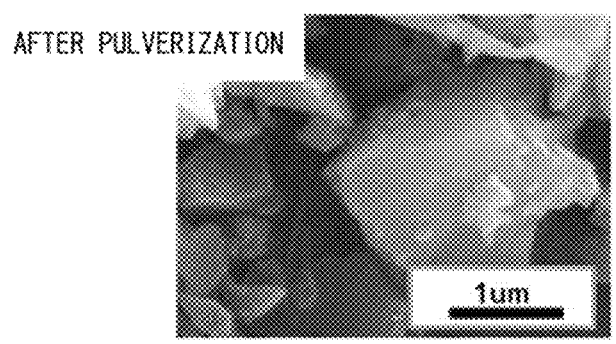
FIG. 5 is an electron micrograph of the LAS-based ceramic powder according to Sample No. 4 (after pulverization) shown in Table 2.

FIG. 2 is an electron micrograph of a LAS-based ceramic powder according to Sample No. 3 (before pulverization) shown in Table 2. FIG. 3 is an electron micrograph of the LAS-based ceramic powder according to Sample No. 3 (after pulverization) shown in Table 2. FIG. 4 is an electron micrograph of a LAS-based ceramic powder according to Sample No. 4 (before pulverization) shown in Table 2. FIG. 5 is an electron micrograph of the LAS-based ceramic powder according to Sample No. 4 (after pulverization) shown in Table 2. From FIG. 2 to FIG. 5, it is revealed that the LAS-based ceramic powders according to Sample Nos. 3 and 4 after the pulverization are each substantially free of microcracks.

After that, the ceramic powder ($TiO_2$ powder and/or $ZrO_2$ powder) shown in Table 2 was added to each of the LAS-based ceramic powders shown in Table 2, and further, the powders were dry pulverized and mixed with each other and wet pulverized and mixed with each other until a composite ceramic powder achieved an average particle diameter $D_{50}$ of 1.0 µm. After that, the resultant composite ceramic powder was classified with a 350-mesh test sieve. Thus, Sample Nos. 1 to 6 were obtained. The total compositions of Sample Nos. 1 to 6 are shown in Table 2.

(Production of $Bi_2O_3$-based Glass Powder)

A glass batch was prepared by blending raw materials, such as various oxides and carbonates, so that a $Bi_2O_3$-based glass powder comprising as a glass composition, in terms of mol %, 36% of $Bi_2O_3$, 28% of $B_2O_3$, 4% of ZnO, 4% of BaO, 25% of CuO, 1% of $Fe_2O_3$, and 1% of $Al_2O_3$ was obtained. The prepared glass batch was loaded into a platinum crucible and melted at from 1,000° C. to 1,100° C. for 2 hours. Next, the resultant glass melt was formed into a thin sheet shape with a water-cooling roller. Finally, the glass in the thin sheet shape was pulverized with a ball mill, and then subjected to air classification. Thus, a $Bi_2O_3$-based glass powder was obtained. The $Bi_2O_3$-based glass powder had an average particle diameter $D_{50}$ of 2.5 µm, a maximum particle diameter $D_{max}$ of 10 µm, and a thermal expansion coefficient in a range of from 30° C. to 300° C. of $104 \times 10^{-7}/°$ C.

(Production of Sealing Material)

The $Bi_2O_3$-based glass powder described above and the ceramic powder shown in Table 2 were mixed at a volume ratio of 75:25. Thus, a sealing material was obtained.

The resultant sealing material was fired at 500° C. to provide a dense fired body. After that, a measurement sample for push-rod type thermal expansion coefficient measurement (TMA) was produced by processing the fired body into a predetermined shape. TMA was performed in a temperature range of from 30° C. to 300° C. through use of the measurement sample. The thermal expansion coefficient α of the composite ceramic powder was calculated based on the thermal expansion coefficient of the sealing material obtained. The results are shown in Table 2.

As apparent from Table 2, each of Sample Nos. 1 to 3, which included the $TiO_2$ powder and/or the $ZrO_2$ powder, exhibited negative expansion. Meanwhile, each of Sample Nos. 4 to 6, which did not include the $TiO_2$ powder and the $ZrO_2$ powder, exhibited positive expansion or zero expansion, (Reference Example of Ceramic Powder Produced by Melting Method)

A raw material batch shown in Table 3 was loaded into a pot made of alumina having an inner volume of 3.6 L and wet pulverized and mixed for 12 hours. In the pulverization and mixing, 3,000 g of zirconia balls of φ3.0 mm were used as pulverization balls, and 600 ml of an alcohol was used as a dispersion medium.

TABLE 3

| (Mass %) | |
|---|---|
| Aluminum hydroxide | 44 |
| Lithium carbonate | 23 |
| Silicon oxide | 33 |

Next, the raw material batch was loaded into a platinum crucible and melted at 1,580° C. for 1 hour. After that, the resultant melt was poured between forming rollers (twin rollers) to cool and form the melt into a film shape. Subsequently, the resultant film was pulverized with a ball mill, classified with a 250-mesh pass sieve, and then retained at 800° C. for 12 hours in an electric furnace. A temperature increasing rate from room temperature to 800° C. was set to 5° C./min and a temperature decreasing rate from 800 ° C. was set to 1° C./min.

Further, the resultant sintered body was dry pulverized and wet pulverized until an average particle diameter $D_{50}$ of 1.0 µm was achieved, and was then classified with a 350-mesh test sieve. Thus, a LAS-based ceramic powder was obtained.

Finally, the $Bi_2O_3$-based glass powder and the LAS-based ceramic powder were mixed at a volume ratio of 75:25. Thus, a sealing material was obtained. The resultant sealing material was fired at 500° C. to provide a dense fired body. After that, a measurement sample for TMA was produced by processing the fired body into a predetermined shape. TMA was performed in a temperature range of from 30° C. to 300° C. through use of the measurement sample. The thermal expansion coefficient of the LAS-based ceramic powder was calculated based on the thermal expansion coefficient of the sealing material obtained. As a result, the LAS-based ceramic powder had a thermal expansion coefficient of $10 \times 10^{-7}/°$ C.

REFERENCE SIGNS LIST 1 hermetic package
10 package base
11 glass cover
12 base part
13 frame part
14 internal device
15 sealing material layer
L laser light

The invention claimed is:

1. A method of producing a composite ceramic powder, comprising the steps of:
   firing a raw material batch to obtain, through a solid phase reaction, a sintered body having precipitated therein β-eucryptite or a β-quartz solid solution as a main crystal;
   pulverizing the sintered body to obtain a LAS-based ceramic powder; and
   mixing the obtained LAS-based ceramic powder and $TiO_2$ powder and/or $ZrO_2$ powder to obtain a composite ceramic powder.

2. The method of producing a composite ceramic powder according to claim 1, comprising using a pulverized product of a pre-sintered body containing Li, Al, and Si as a whole or part of introduction raw materials for Li, Al, and Si of the LAS-based ceramic powder.

3. The method of producing a composite ceramic powder according to claim 1, comprising using any one of an oxide raw material, a hydroxide raw material, and a carbonate raw material as a whole or part of introduction raw materials for Li, Al, and Si of the LAS-based ceramic powder.

4. The method of producing a composite ceramic powder according to claim 1, comprising blending the raw material batch so that the LAS-based ceramic powder to be obtained comprises as a composition, in terms of mol %, 10% to 35% of $Li_2O$, 10% to 35% of $Al_2O_3$, and 30% to 80% of $SiO_2$.

5. The method of producing a composite ceramic powder according to claim 1, wherein the firing a raw material batch is performed at from 1,000° C. to 1,450° C. to obtain, through the solid phase reaction, the sintered body having precipitated therein β-eucryptite or a β-quartz solid solution as a main crystal.

6. The method of producing a composite ceramic powder according to claim 1, wherein the pulverizing the sintered body is performed so that the LAS-based ceramic powder is substantially free of microcracks.

7. The method of producing a composite ceramic powder according to claim 1, wherein a content of the $TiO_2$ powder and the $ZrO_2$ powder in terms of a total content is from 0.05 mass % to 10 mass %.

8. The method of producing a composite ceramic powder according to claim 1, wherein the composite ceramic powder is substantially free of a glass phase.

9. A method of producing a sealing material, comprising a glass powder and a composite ceramic powder, wherein the composite ceramic powder is produced by the method of producing a composite ceramic powder according to claim 1.

\* \* \* \* \*